March 3, 1936.  A. C. GILBERT ET AL  2,032,571
KITCHEN UTILITY DEVICE
Filed Jan. 25, 1934  2 Sheets-Sheet 1
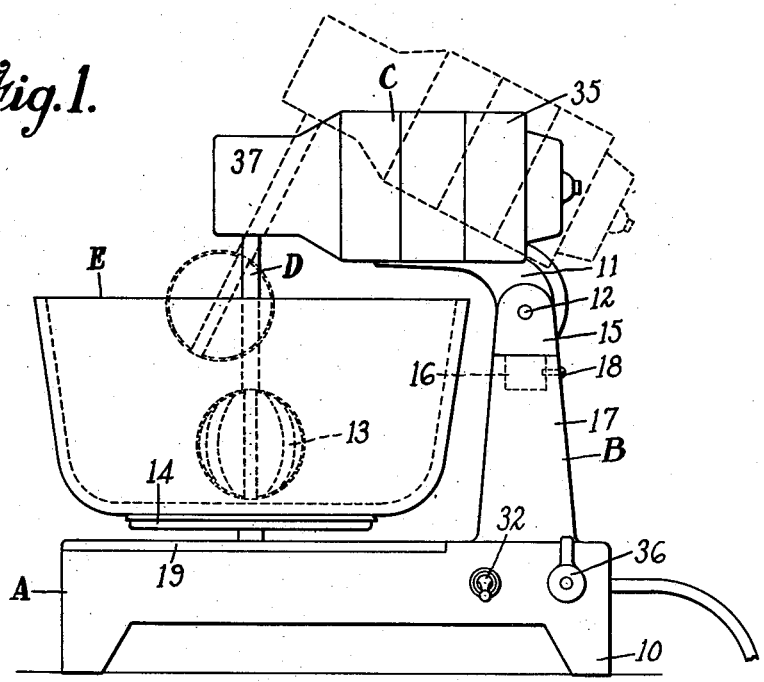
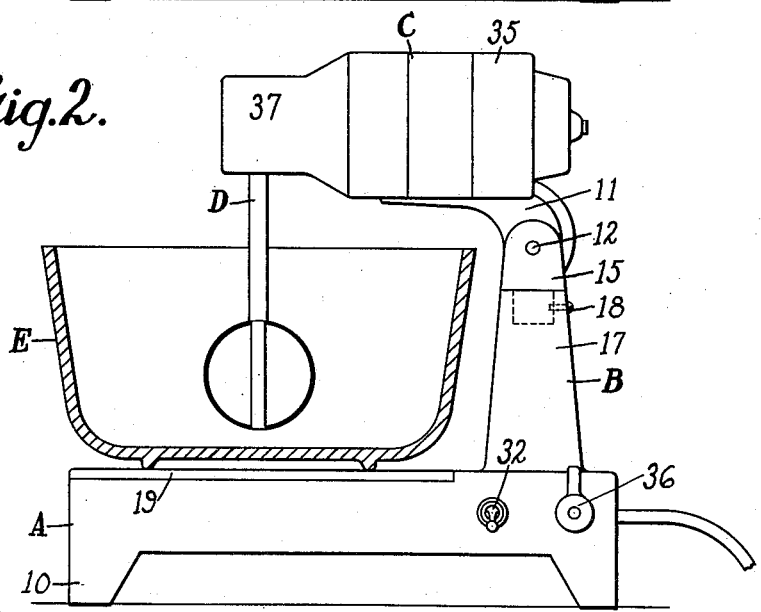
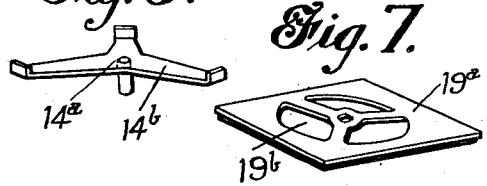

March 3, 1936.  A. C. GILBERT ET AL  2,032,571
KITCHEN UTILITY DEVICE
Filed Jan. 25, 1934  2 Sheets-Sheet 2
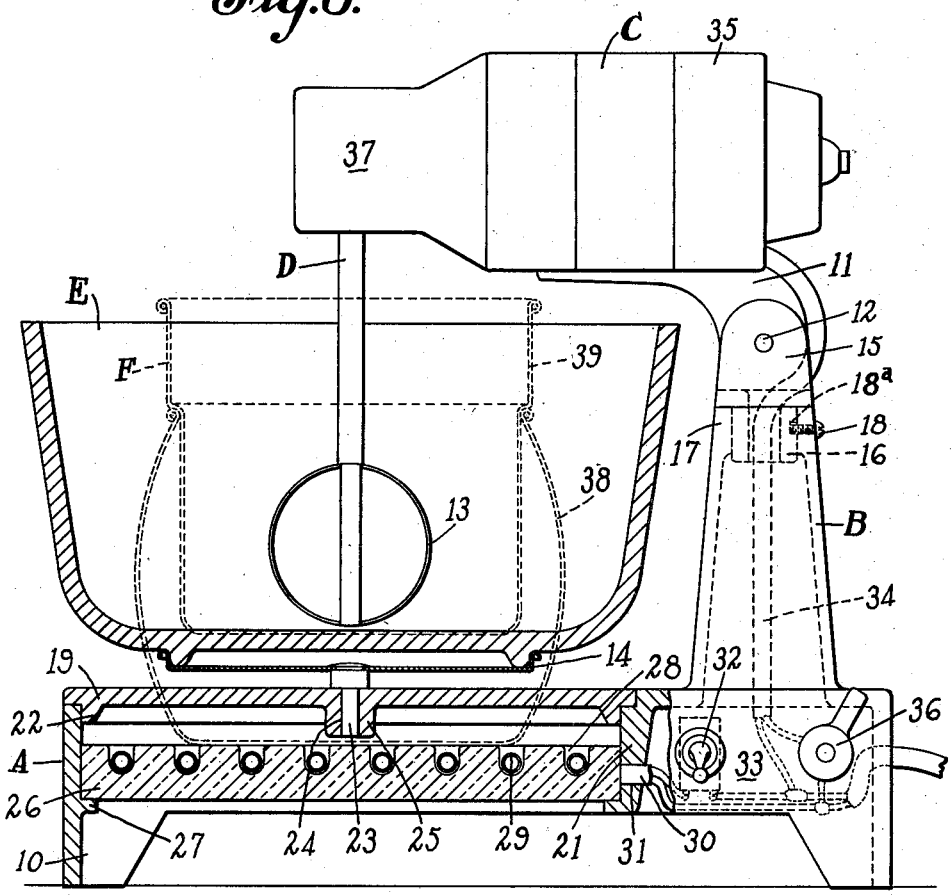
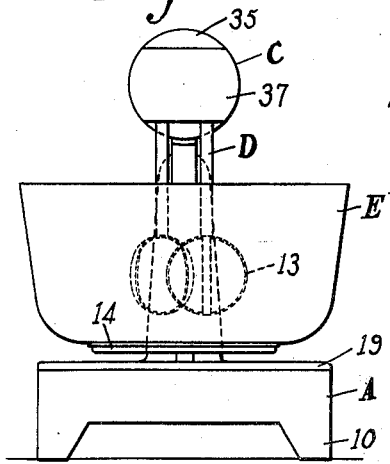
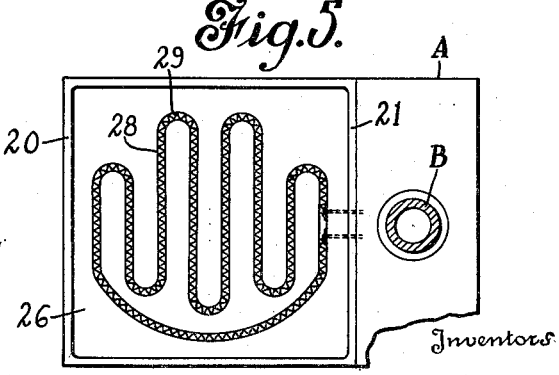

Patented Mar. 3, 1936

2,032,571

UNITED STATES PATENT OFFICE 2,032,571

KITCHEN UTILITY DEVICE

Alfred C. Gilbert, North Haven, and Arthur A. Arnold, New Haven, Conn., assignors to The A. C. Gilbert Company, New Haven, Conn., a corporation of Maryland Application January 25, 1934, Serial No. 708,230

14 Claims. (Cl. 259—84)

This invention relates to kitchen utility devices and has more particular application to electrically driven devices for mixing, beating and whipping edible substances in the preparation of food in the kitchen. It has particular reference to devices in which a mixing bowl is employed in connection with an electrically driven agitator or agitators extending down into the bowl for mixing or otherwise acting upon the contents thereof in the preparation of various articles of food in the kitchen.

Devices of this general class have been provided with removable motor units which could be taken off of the supporting pedestal so that while held in the hand the agitating element could be used to act in receptacles at a distance from the stand, for example, when it was desired to stir materials subject to the action of heat, such as gravy in a pan on the cookstove, or other materials or substances which it is desired to agitate or stir during cooking or during the maintenance of a relatively high temperature. This procedure, however, has been open to serious drawbacks and inconveniences owing to the fact that the motor element when disconnected from the stand and taken to the cookstove must retain its connection with the electric conductor cord, which conductor cord does not permit the necessary latitude of movement, or in any case is obstructive and seriously hampers operations at the stove. The procedure mentioned is also open to the serious objection that heating or cooking of the contents of a receptacle requires it to be taken to the cookstove or range, and that agitation of the contents of a receptacle requires it to be taken to the stand of the mixing device if satisfactory agitation is to be effected (as action by the agitator over the cookstove or range is frequently either impossible or quite unsatisfactory); and the transporting of receptacles between the mixer stand and the range as well as the holding of the agitator in the hand during mixing are time-consuming and troublesome.

One of the objects of our invention is to overcome these disadvantages.

Another object of our invention is to provide an improved combined mixer and stove.

Another object is to provide an improved electric stove.

Another object is to provide a mixer having a rotary turntable on which a bowl is mounted in operative relation to a depending agitating element, said mixer having provisions for imparting heat to the bowl contents.

Another object is to provide a mixing device having a rotary agitating element with means for rotatably supporting a mixing bowl cooperating with the agitating element, and with provisions for heating the contents of another receptacle such as a double boiler adapted to be used in connection with the device in place of a mixing bowl and to be heated during agitation of its contents by the agitating element, said receptacle when supported in the heating position having an upper vessel so located that its contents can be satisfactorily agitated by the agitating element without the necessity of altering the operative position of said element as used in connection with the mixing bowl.

To these and other ends the invention consists in the novel features and combinations of parts to be hereinafter described and claimed.

In the accompanying drawings:

Fig. 1 is a side elevation of a device embodying our improvements showing the mixing bowl mounted on the turntable;

Fig. 2 is a similar view showing the turntable removed and the mixing bowl resting on the cover of the stove which is located in the base portion of the mixer;

Fig. 3 is an enlarged view of the parts shown in Fig. 1, certain parts being shown in section;

Fig. 4 is a front elevation of the device on a smaller scale;

Fig. 5 is a top plan view of the base portion of the device with the cover or lid removed showing the heating element; and Figs. 6 and 7 are perspective views of a modified form of turntable and cover respectively.

In the particular example of the device which we have selected for illustration and description, the base indicated generally at A and which may be of any desired contour is in the nature of an electric stove, inasmuch as it is provided with a suitable resistance heater, as hereinafter described. In the form shown the base A is rectangular, and is provided at the corners with feet 10 supporting it in somewhat elevated position from the table. At one end of the base a pedestal B is provided, and suitably mounted on the upper portion of this pedestal is an electric motor member C having duplex depending agitators D adapted to extend down into a mixing bowl E supported on the base of the device. In the particular form shown the motor member C is carried by a bracket 11 pivoted on the upper end portion of the pedestal on a pivot pin 12 so that the motor member is capable of being tilted up and down. Fig. 1 shows in dotted lines the position of the motor member and agitating elements when they are tilted upwardly, and in this position the mixing bowl can be readily withdrawn from the base A. We do not limit ourselves to any particular provisions for mounting the motor member so that it can be tilted, and in some aspects of our invention the tilting mounting for the motor member is not required. It is advisable to provide means whereby the position of the agitators D in the bowl can be adjusted so that the agitators may be located centrally or eccentrically of the bowl, and it will be understood that when the agitators are located eccentrically of the bowl the rotation of the oppositely rotating beaters 13 at the lower ends of the agitators D will induce rotation of the bowl E in one or the other direction depending upon the location of the agitators. In order to permit the bowl E to rotate freely under the driving influence of the agitators, the bowl is mounted on a rotary turntable 14. In order to permit the agitators 13 to occupy the different locations above mentioned, we prefer to mount the motor member C on a swivel mounting, although this particular arrangement is not necessary in all cases. In the form shown the motor member has a swivel mounting and can move in a horizontal plane relatively to the pedestal, for which purpose the upper end portion 15 of the pedestal has a portion 16 extending down into and swiveled in the hollow upper open end of the pedestal member 17. The downwardly projecting part 16 is engaged by means carried by member 17, which means while permitting the free swinging of the motor member in a lateral direction prevents dislocation of the parts of the swivel mounting. Preferably the swinging movement of the agitators relatively to the bowl E is limited so that while the agitators can be swung across the bowl almost into contact with the wall of the bowl at the respective sides, they cannot actually contact the wall of the bowl at either side. In the form shown we have illustrated a screw 18 engaging a groove 18ᵃ in the projection of member 15, the groove 18ᵃ being of such length and location as to cause the movement of the agitators to be limited in the manner above described. Other provisions for this purpose may, however, be employed if desired.

The turntable 14 previously mentioned is preferably constructed of sheet metal and is mounted for rotation on a member 19 in the nature of a lid or cover associated with the stove in the base A. This lid or cover may be of rectangular shape and it is adapted to rest on the margin 20 of the base and on a transverse wall or partition 21 extending across the base. The lid or cover is also provided with a flange 22 extending down into the opening or depression in the base provided by the walls of the base structure when the cover is removed and engaging said walls so as to prevent lateral displacement of the lid or cover when the same is in place on the base. The turntable 14 and the lid 19 may both be made of metal, the lid being preferably of cast metal, and a connection between the turntable and the lid whereby the former is rotatably supported on the latter may comprise a spindle 23 carried by the turntable and removably engaging a bore 24 in a central hub portion 25 formed on the lid 19.

Beneath the lid 19 a suitable heating element is provided. Many variations may be made in the form of the heating element employed, but we prefer to use a porcelain block 26 set in the opening adapted to be covered by the lid 19 and resting on a marginal inwardly extending flange 27 on the walls of the base extending around the opening in the base structure at the lower edge of said opening. The upper face of the porcelain or other refractory element is provided with grooves 28 of suitable depth and conformation to receive a helical wire heating coil 29. This heating coil may be disposed in convolutions, as shown in Fig. 5, or in many other different ways, as may seem most desirable. The ends of the coil are connected to a conductor cord 30 passing through a hole 31 in the transverse wall 21, and a switch 32 may be used for cutting the heater coil in or out. The switch 32 may conveniently be of the tilting lever type and may be conveniently mounted on the side wall 33 of the base at a point beneath the pedestal B. The conductor cord 30 extends out of the rear wall of the base and may be connected to an electric light socket in the usual manner. Branching off from the conductors of this cord 30 at a point within the base are leads jacketed in a cover 34 which pass up to the motor located within the casing 35 of motor member C. In one of these leads is a switch device 36, which in the usual manner is adapted to control the starting and stopping and speed of rotation of the motor of motor member C.

Any suitable means may be employed for driving the agitators D from the electric motor. Driving gearing suitable for the purpose is well known in the art and we do not consider it necessary to illustrate the same herein, but it will be understood that the gearing for driving the agitators is contained in a housing 37 projecting forwardly from the free end portion of the motor member. It will also be understood that the agitators D may be independently removable from their driving gearing located in housing 37.

While we have shown the heating resistor 29 as controlled by a two-position switch 32, it is apparent that if desired the resistor may be controlled in such a manner as to give a number of different degrees of heat. It will be understood that if desired a number of heating resistors can be employed which are usable in different combinations to produce different degrees of heat depending upon the position of a switch having three or more positions. Any well-known method of controlling the heat of the electric stove can be employed.

The method of using our device will be apparent for the most part from the foregoing description. When the mixing bowl E is arranged on the turntable in the manner shown in Fig. 1, mixing can be carried on in a manner previously known in the art without the energizing of the heating resistor. When it is desired, however, to maintain or raise the temperature of the contents of the bowl, the circuit of the heating element can be closed. This will cause the transmission of heat to the lid located over the heating element, and from the lid heat will be radiated to the bowl. If desired, the turntable 14 with its spindle 23 can be removed and the bowl placed directly on the lid 19, as shown in Fig. 2. Further, the device can be used in connection with different receptacles whose contents it is desired to heat by placing such receptacles directly on the refractory element 26 and in this case heat will be transmitted very directly to the receptacle. Further, the contents of the receptacle can be stirred by the agitators during the heating process as in the case of the mixing bowl, so that the two operations of heating and agitating can be carried on concurrently. On the other hand, if it is desired to produce the heating effect alone without the employment of the agitators, the latter can be swung upwardly to the position indicated in dotted lines in Fig. 3, or to a similar position so that the agitators will be clear of the contents of the receptacle during the heating. In practice we prefer to employ means well known in the art, not shown herein, for arresting the upward tilting movement of the motor member at the desired point (which may correspond to the position shown in dotted lines in Fig. 1), and when the motor member reaches this position the structure is such that the motor member will be held in that position by the action of gravity or otherwise, or, in other words, prevented from dropping down to the mixing position. Thus it will be understood that when the agitators are moved out of the receptacle they will stay in the upper position referred to as long as this is desired.

Among the receptacles which may be placed directly on the heating element of the stove when the lid 19 is removed are sauce pans and double boilers. In Fig. 3 we have shown the position taken by a double boiler F of usual type having a lower vessel 38 and an upper vessel 39. It will be noted that when the double boiler is located in the manner described and as shown in Fig. 3, the beater elements 13 of the agitators will have a proper relation to the upper vessel 39 for stirring the contents thereof while the vessel is subject to heat from the stove element, and it will be noted, furthermore, that in this particular case the double boiler when placed in position on the heating element will have the bottom of its upper vessel located at substantially the same level occupied by the bottom of bowl E when the latter is in place on the turntable. It will be understood that the double boiler and the mixing bowl can be used interchangeably with the agitating elements and the stove when said latter elements are in use conjointly. The bottom of the receptacle whose contents are being stirred has substantially the same relation to the agitating element whether the receptacle be the mixing bowl or the double boiler, but where the mixing bowl is employed on the turntable, as in the arrangement shown in Fig. 3, the bottom of the receptacle will be located higher up than the bottom of the lower vessel of the double boiler and will have less heat transmitted thereto.

By our improvements the necessity of carrying receptacles from the mixer stand to the cooking range, and vice versa, is to a large extent overcome, and thus time is saved and operation is facilitated. Furthermore, it is unnecessary to provide a detachable connection between the motor member and its pedestal for the purpose of enabling the motor member to be carried from the stand over to the cooking range. The stove portion of the device can be used in a number of cases when it is not desired to agitate the contents of the receptacle, and in such cases the lid 19 may or may not be used. The agitators when not in use will be held in their upwardly tilted position. On the other hand, when it is desired to agitate the contents of a receptacle being heated, this can be readily done by lowering the motor member and closing the switch controlling the same. The lid 19 or its equivalent not only serves as a cover for a heating element on which food materials may be heated and cooked, but it also serves as a support for a turntable carrying a rotatable mixing receptacle whose contents can be stirred by the agitating element. Our device is also useful as providing a suitable support for a double boiler adapted to be used for mixing or for mixing and heating in place of a turntable-mounted bowl with which the mixer device is adapted to be used. When it is desired to use the device as a stove only, the agitators can be removed from the bowl either by the tilting of the motor member C in the manner previously described or by removing the agitators D from their connection with the gearing inside of the gear housing 37. When the agitators are removed or separated from their driving gearing, the receptacles can usually be placed in position over the stove element without the necessity of swinging the motor member upwardly, and in some cases the provisions for upward swinging of the motor member can be omitted. We prefer the tiltable mounting of the motor member, however, inasmuch as it permits easier access to the receptacle from above.

In Fig. 6 we have shown a modified form of turntable 14ᵃ in the form of a spider having arms 14ᵇ; and in Fig. 7 we have shown a modified form of cover or lid 19ᵃ having openings or cut-outs 19ᵇ therein. By the use of such a spider and cover the heating effect upon the mixing bowl supported by the turntable is increased. The bowl should be made of suitable heat-resisting material such as oven glass or metal.

It will be manifest that in the particular forms of our invention herein described the lower vessel or receptacle of the double boiler acts as a means for supporting the upper vessel or receptacle in upwardly spaced relation with respect to the heating element with its bottom in close proximity to the beater on the lower end of the agitator, and that the cover and turntable act as means for supporting the receptacle E so that its bottom has the same relation to the agitating element and to the heating element above mentioned.

Various changes can be made in the details of the structure without departing from the principles of our invention as defined in the claims. We have not attempted to illustrate or describe all of the many modifications of structure which may be made within the limits of our inventive concept.

What we claim is:

1. In a device such as described, a tiltably mounted motor-driven depending agitator, a base member having a depression in the upper surface thereof, a receptacle surrounding the agitator and having its bottom in close proximity thereto in a region located above the base member, a second receptacle in nested relation to the first and supported from, and in the depression in, the base member by engagement of its bottom therewith, said second receptacle supporting the first in the above defined relation to the agitator, and a removable receptacle support positioned on the base and adapted to support a receptacle thereabove with its bottom in proximity to the agitator.

2. In a device such as described, a tiltably mounted motor-driven depending agitator, a base member having a depression in the upper surface thereof, a receptacle surrounding the agitator and having its bottom in close proximity thereto in a region located above the base member, a second receptacle in nested relation to the first and supported from, and in the depression in, the base member by engagement of its bottom therewith, said second receptacle supporting the first in the above defined relation to the agitator, and means located beneath the bottom of the second receptacle for heating the same, and a removable receptacle support positioned on the base and adapted to support a receptacle thereabove with its bottom in proximity to the agitator.

3. In a device such as described, a tiltably mounted motor-driven depending agitator, a base member, a receptacle surrounding the agitator and having its bottom in close proximity thereto in a region located above the base member, a second receptacle in nested relation to the first and supported from the base member by engagement of its bottom therewith, said second receptacle supporting the first in the above defined relation to the agitator, means located beneath the bottom of the second receptacle for heating the same, said last-named means comprising an electric stove element mounted within and below the upper surface of the base member, a removable cover for said stove element which when placed in position is spaced upwardly therefrom, and a receptacle support above and carried by said cover.

4. In a device such as described, a motor-driven depending agitator, a mixing receptacle formed as a bowl, a cooking receptacle of greater depth than said bowl, and a base structure unitarily related to said agitator, said base having supports for said receptacles arranged at different levels, and one of said supports being below the upper surface of the base and comprising a heating element.

5. In a device such as described, a motor-driven depending agitator, a mixing receptacle formed as a bowl, a cooking receptacle of greater depth than said bowl, a base structure unitarily related to said agitator and having a recess in the top thereof and provisions including a removable cover element for the recess, whereby said receptacles may be supported on the cover or the bottom of the recess, and a heating element at the bottom of said recess.

6. In a device such as described, a motor-driven depending agitator, a mixing receptacle formed as a bowl, a cooking receptacle of greater depth than said bowl comprising an upper vessel and a lower supporting vessel for the upper vessel having its bottom spaced downwardly from that of the upper vessel, and a base structure having provisions for supporting either of said receptacles in operative relation to the agitator, the first receptacle being supported with its bottom at a level above the upper surface of the base, and the lower vessel of the second receptacle being supported with its bottom below the level of the upper surface of the base.

7. In a device such as described, a motor-driven depending agitator, a mixing receptacle formed as a bowl, a cooking receptacle of greater depth than said bowl comprising an upper vessel and a lower supporting vessel for the upper vessel having its bottom spaced downwardly from that of the upper vessel, and a base structure unitarily related to said agitator and having provisions for supporting either of said receptacles in operative relation to the agitator, the first receptacle being supported with its bottom at substantially the same level as the bottom of the upper vessel of the second receptacle, said supporting provisions of the base structure including a support within and below the upper surface of the base member and a second support adapted to be removably positioned over and above the first support in spaced relation thereto.

8. In a device such as described, a motor-driven depending agitator, a mixing receptacle formed as a bowl, a cooking receptacle of greater depth than said bowl comprising an upper vessel and a lower supporting vessel for the upper vessel having its bottom spaced downwardly from that of the upper vessel, and a base structure unitarily related to said agitator and having provisions for supporting either of said receptacles in operative relation to the agitator, the first receptacle being supported with its bottom at substantially the same level as the bottom of the upper vessel of the second receptacle, said supporting provisions of the base structure including a support within the base member and a second support adapted to be removably positioned over and above the first support in spaced relation thereto, said first support comprising a heating element.

9. In a device such as described, a motor-driven depending agitator, a mixing receptacle formed as a bowl, a cooking receptacle of greater depth than said bowl comprising an upper vessel and a lower supporting vessel for the upper vessel having its bottom spaced downwardly from that of the upper vessel, and a base structure unitarily related to said agitator and having provisions for supporting either of said receptacles in operative relation to the agitator, the first receptacle being supported with its bottom on substantially the same level as the bottom of the upper vessel of the second receptacle, said provisions including a heating element arranged to support one of said receptacles.

10. In a kitchen utility device, a motor member having a depending agitator, a turntable for a mixing bowl rotatably and removably mounted beneath the agitator, and means for supporting and subjecting to heat, when said turntable is removed, a receptacle in cooperative relation to said agitator having its base at a lower level than the operative position of the turntable, including a base structure for the device and a heating element within the base.

11. In a kitchen utility device, a base structure having a pedestal rising therefrom, a motor member supported from the upper end portion of the pedestal and having a depending agitator, a rotary turntable for a mixing bowl removably associated with said base structure beneath said agitator, and means for supporting and subjecting to heat, when said turntable is removed a receptacle in cooperative relation to said agitator having its base in a lower plane than the plane of operative position of the turntable, said lower plane being located below the upper surface of the base structure.

12. In a device such as described, an agitating element, a turntable for supporting a receptacle in operative position beneath said agitating element, a hollow base having a removable cover supporting said turntable, a receptacle support within the base, a bowl-shaped receptacle adapted to rest upon the turntable, and a second receptacle of substantially different dimensions adapted to be supported on said support within the base.

13. In a device such as described, an agitating element, a receptacle, another receptacle substantially differing in dimensions from the first, and a base structure for rotarily supporting one of said receptacles in cooperative relation to the agitating element and for supporting and heating the other receptacle while in cooperative relation to said agitating element but at a lower level than the first.

14. A mixing device of the character described comprising a base and an agitating element operatively supported in a depending position above the base, said base having a recess in the upper surface thereof within which a receptacle may be received, a removable cover for the recess in the base, and a turntable rotatably carried on said cover and providing a supporting surface for a receptacle above the recess.

ALFRED C. GILBERT.
ARTHUR A. ARNOLD.